(12) United States Patent
Matsumoto et al.

(10) Patent No.: US 10,194,076 B2
(45) Date of Patent: Jan. 29, 2019

(54) OPTICAL SYSTEM AND PHOTOGRAPHING APPARATUS

(71) Applicant: OMRON Corporation, Kyoto (JP)

(72) Inventors: Shinya Matsumoto, Osaka (JP); Tuo Zhuang, Kawasaki (JP)

(73) Assignee: OMRON Corporation, Kyoto (JP)

(*) Notice: Subject to any disclaimer, the term of this patent is extended or adjusted under 35 U.S.C. 154(b) by 15 days.

(21) Appl. No.: 15/385,824

(22) Filed: Dec. 20, 2016

(65) Prior Publication Data

US 2017/0214851 A1     Jul. 27, 2017

(30) Foreign Application Priority Data

Jan. 21, 2016   (JP) .................. 2016-010086

(51) Int. Cl.
*G02B 5/00* (2006.01)
*G02B 7/02* (2006.01)
(Continued)

(52) U.S. Cl.
CPC ......... *H04N 5/23229* (2013.01); *G02B 5/005* (2013.01); *G02B 7/021* (2013.01);
(Continued)

(58) Field of Classification Search
CPC .... G02B 27/0075; G02B 5/005; G02B 7/021; G06T 5/001; G06T 5/20; H04N 5/2254; H04N 5/23229
See application file for complete search history.

(56) References Cited

U.S. PATENT DOCUMENTS 6,072,634 A * 6/2000 Broome ................ G02B 5/005
359/627
6,491,628 B1 * 12/2002 Kobayashi ......... A61B 1/00059
600/168
(Continued)

FOREIGN PATENT DOCUMENTS

EP      2503364       9/2012
JP    2003-235794     8/2003
(Continued)

OTHER PUBLICATIONS

Oliver Cossairt et al.,"Diffusion Coded Photography for Extended Depth of Field", ACM Trans. on Graphics ,vol. 29, No. 4,Jul. 26, 2010,pp. 1-10.
(Continued)

*Primary Examiner* — Amy R Hsu
(74) *Attorney, Agent, or Firm* — JCIPRNET

(57) ABSTRACT

The present invention provides a fixed focus-type photographing apparatus, which can inexpensively and simply increase a depth of field by disposing a removable light diffusion plate in an existing lens optical system, and an optical system of the photographing apparatus. A photographing apparatus includes: an optical system, including two or more than two lenses, a diaphragm disposed between any two adjacent lenses of the lenses, and a light diffusion plate disposed at a position that is in front of a forefront first lens; and a photographing element, disposed at a position that is behind a rearmost lens, where: the light diffusion plate includes a light diffusion surface, and a distance a from a front surface of the first lens to the diaphragm is less than a distance b from the diaphragm to the photographing element.

5 Claims, 21 Drawing Sheets

(51) Int. Cl.
  *G06T 5/00* (2006.01)
  *G06T 5/20* (2006.01)
  *G02B 27/00* (2006.01)
  *H04N 5/225* (2006.01)
  *H04N 5/232* (2006.01)

(52) U.S. Cl.
  CPC .......... *G02B 27/0075* (2013.01); *G06T 5/001* (2013.01); *G06T 5/20* (2013.01); *H04N 5/2254* (2013.01)

(56) References Cited

U.S. PATENT DOCUMENTS

| | | | |
|---|---|---|---|
| 9,609,292 B2* | 3/2017 | Yamanaka | H04N 5/2254 |
| 2008/0297632 A1* | 12/2008 | Muramatsu | H04N 5/202 |
| | | | 348/254 |
| 2011/0017827 A1* | 1/2011 | Hayashi | G02B 13/005 |
| | | | 235/462.11 |
| 2013/0076930 A1* | 3/2013 | Border | H04N 5/23212 |
| | | | 348/222.1 |
| 2013/0194458 A1* | 8/2013 | Nayar | G06T 5/003 |
| | | | 348/241 |
| 2015/0002731 A1* | 1/2015 | Raskar | H04N 5/2353 |
| | | | 348/362 |
| 2015/0103229 A1* | 4/2015 | Nozawa | G02B 5/201 |
| | | | 348/342 |
| 2015/0326771 A1* | 11/2015 | Maruyama | H04N 5/2353 |
| | | | 348/234 |
| 2016/0057407 A1* | 2/2016 | Klehm | H04N 5/2254 |
| | | | 348/343 |
| 2016/0131878 A1* | 5/2016 | Nomura | G02B 13/24 |
| | | | 359/740 |

FOREIGN PATENT DOCUMENTS

| | | | | |
|---|---|---|---|---|
| JP | 5567692 | 8/2014 | | |
| WO | 2009119838 | 10/2009 | | |
| WO | 2014203151 | 12/2014 | | |
| WO | WO 2014203151 A1 * | 12/2014 | ............ | G01J 3/0205 |
| WO | WO-2014203151 A1 * | 12/2014 | ............ | G01J 3/0205 |
| WO | 2015146506 | 10/2015 | | |

OTHER PUBLICATIONS

"Search Report of Europe Counterpart Application," dated Aug. 2, 2017, p. 1-p. 13, in which the listed references were cited.

"Partial Search Report of Europe Counterpart Application", dated May 23, 2017, p. 1-p. 13, in which the listed references were cited.

Hangyin Zhou Ey Al., "Depth from Diffusion", IEEE Conference on Computer Vision and Pattern Recognition (CVPR), Jun. 2010, pp. 1110-1117.

* cited by examiner

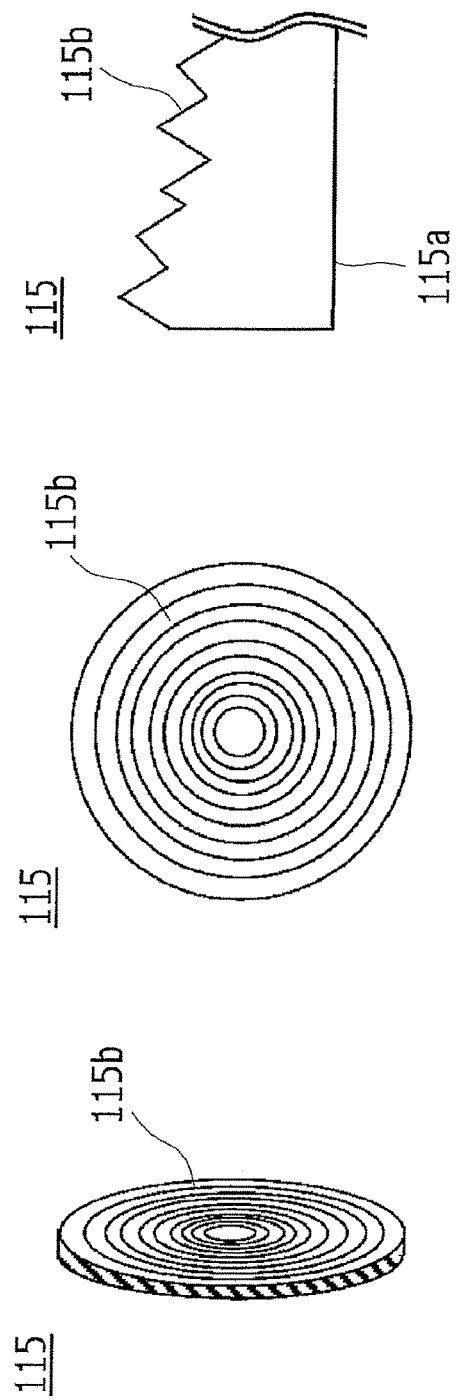
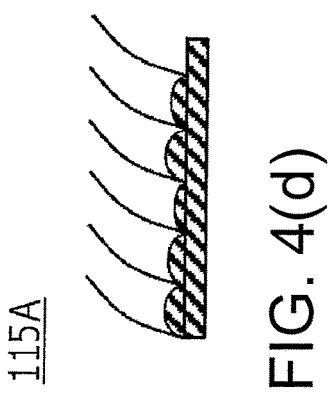
FIG. 4(a)　FIG. 4(b)　FIG. 4(c)　FIG. 4(d)

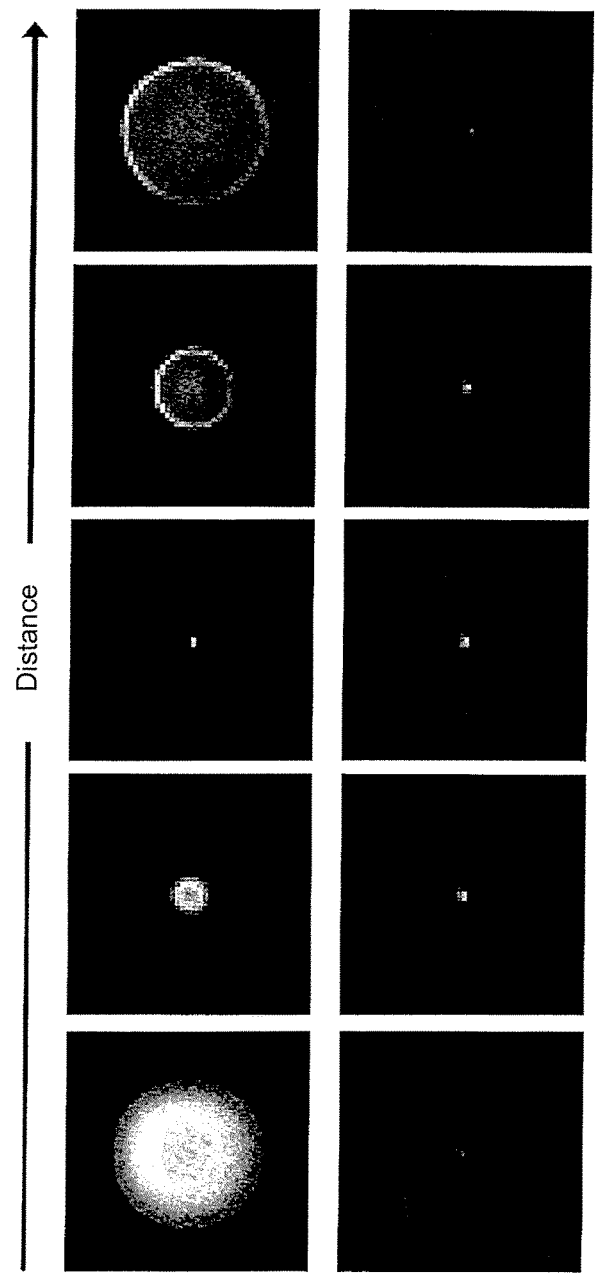

OPTICAL SYSTEM AND PHOTOGRAPHING APPARATUS

CROSS-REFERENCE TO RELATED APPLICATION

This application claims the priority benefits of Japan patent application no. JP 2016-010086, filed on Jan. 21, 2016. The entirety of the above-mentioned patent application is hereby incorporated by reference herein and made a part of this specification.

BACKGROUND OF THE INVENTION

1. Field of the Invention

The present invention generally relates to an optical system and a photographing apparatus, in particular, to an optical system and a photographing apparatus of an information code reading apparatus applicable to reading an information code such as a bar code or a two-dimensional code.

2. Description of Related Art

Previously, to read information code such as a bar code or a two-dimensional code, there are the following known methods: a method for implementing focusing by moving a focus lens of an optical system to a focus position; and a method of narrowing an aperture diaphragm to increase an F value, so as to increase an optical depth of field, thereby broadening a focus range (for example, refer to the Background of the Invention part of reference patent document 2).

In addition, there is also a method of increasing a depth of field by deliberately increasing a spherical aberration of an optical system. Specifically, there is still a method of deliberately increasing a spherical aberration by inserting a phase plate into the interior of an optical system and the like (for example, refer to patent document 1 and patent document 2).

According to another aspect, a system, a method, and a medium for recording an image using an optical diffuser (a light diffusion plate), where the optical diffuser is disposed on an aperture (a diaphragm) of a camera lens (for example, refer to patent document 3).

Herein, a depth of field and a sagitta (sagittal) and a tangent (tangential) that represent a direction of a light ray are described in advance.

FIG. 21 is a brief illustrative diagram of a depth of field.

As shown in FIG. 21, a point on a photographed object surface O that passes through a lens whose F value is F and whose focal distance is f and that is away from a lens center by an object distance s is imaged in a form of a point on an image surface O' that is way from the lens center by an image distance s', but if the point deviates from the image surface O' in front of or behind the image surface O', the point is imaged in a form of a circle. The circle is referred to as a circle of confusion, and a circle that is considered to have a maximum diameter ε of focusing is referred to as a permissible circle of confusion. With regard to a range of a side of the image surface O' corresponding to the permissible circle of confusion, $\alpha'1$ and $\alpha'2$ are collectively referred to as a focal depth $\alpha'$. Furthermore, with regard to a range of a side of the photographed object surface O corresponding to the focal depth $\alpha'$, $\alpha1$ and $\alpha2$ are collectively referred to as a depth of field $\alpha$.

In addition, the so-called sagittal plane is a plane including an optical axis and a chief light ray and corresponds to a radial direction from a surface center. The so-called tangential plane is a pane that includes the chief light ray and that is perpendicular to the sagittal plane and corresponds to a tangential direction of concentric circles.

PRIOR ART DOCUMENTS

Patent Documents

[Patent document 1] JP2003-235794
[Patent document 2] WO2009/119838
[Patent document 3] JP5567692

SUMMARY OF THE INVENTION

However, in the prior art as disclosed by patent document 1 and patent document 2, it is needed to deliberately design an optical system to have a large aberration, so that the optical design carried therein has a large load. In addition, it cannot be used as an ordinary lens and needs to be designed as a special optical system with universality.

In addition, in an apparatus using a phase plate, although spot diameters are approximately even in an optical axis direction (near a focal depth), spot differences at the center and on the edge of an image cannot be completely consistent, and in particular, in terms of design, it is also extremely difficult to enable sagittal/tangential light rays to be consistent on respective distances.

In addition, as the F value increases with respect to the opening, a sagitta and a tangent inside a field of view generate great differences, and during restoration in signal processing, an image state including an edge inside a photographing range does not become an even state, so that disadvantages in terms of performance exist in a scene where it is necessary to read a code in the whole screen area.

With regard to the problem in the prior art as stated above, the present invention is directed to providing a fixed focus-type photographing apparatus, which can inexpensively and simply increase a depth of field by disposing a removable light diffusion plate in a previously-designed lens optical system without using a special optical design that costs a great amount of development time, and an optical system using the photographing apparatus.

To achieve the objective, a photographing apparatus of the present invention includes: an optical system, including two or more than two lenses, a diaphragm disposed between any two adjacent lenses of the lenses, and an optical element disposed at a position that is in front of a forefront first lens of the lenses; and a photographing element, disposed at a position that is behind a rearmost final lens of the lenses, where: the optical element includes a light diffusion surface, and a first distance from a front surface of the first lens to the diaphragm is less than a second distance from the diaphragm to the photographing element. In addition, it could also be set in this way that: a third distance from the light diffusion surface to the diaphragm and the first distance satisfy a relationship: 0≤the first distance≤the third distance.

Alternatively, a photographing apparatus of the present invention includes: an optical system, including two or more than two lenses, a diaphragm disposed between any two adjacent lenses of the lenses, and an optical element disposed at a position that is behind a rearmost final lens of the lenses; and a photographing element, disposed at a position that is behind the optical element, where: the optical element includes a light diffusion surface, and a first distance from a front surface of a first lens to the diaphragm is greater than a second distance from the diaphragm to the photographing element. In addition, it could also be set in this way that: a third distance from the light diffusion surface to the diaphragm and the second distance satisfy a relationship: 0≤the third distance≤the second distance.

Here, the so-called "front" refers to a side through which a light ray is incident onto an optical system, and the so-called "rear" refers to a side through which a light ray is emergent from an optical system.

According to the photographing apparatus of such a structure, a fixed focus-type photographing apparatus, which can inexpensively and simply increase a depth of field by disposing a removable light diffusion plate in an existing lens optical system, can be implemented.

The photographing apparatus of the present invention may further includes: an image restoration processing part, which performs image processing and restoration processing on image data acquired by the photographing element; and a restored image output part, which outputs an image restored by the image restoration processing part.

Herein, the image restoration processing part may also include a Wiener filter or a Finite Impulse Response (FIR) filter manufactured from a pattern that is diffused to be incident on a point function of the photographing element, but the present invention is not limited to the filters. In addition, the light diffusion surface is a circular ring structure of point symmetry and is a shape with discontinuous height gaps or a lens shape, but the present invention is not limited to the shapes.

An optical system of the present invention includes two or more than two lenses; a diaphragm, disposed between any two adjacent lenses of the lenses; and an optical element, disposed at a position that is in front of a forefront first lens of the lenses, where: the optical element includes a light diffusion surface, and a first distance from a front surface of the first lens to the diaphragm is less than a second distance from a photographing element that is behind a rearmost final lens of the lenses to the diaphragm.

Alternatively, an optical system of the present invention includes: two or more than two lenses; a diaphragm, disposed between any two adjacent lenses of the lenses; and an optical element, disposed at a position that is behind a rearmost final lens of the lenses, where: the optical element includes a light diffusion surface, and a first distance from a front surface of a forefront first lens of the lenses to the diaphragm is greater than a second distance from a photographing element disposed at a position behind the optical element to the diaphragm.

According to the optical system of this structure, an optical system applicable to the foregoing photographing apparatus may be implemented.

According to the photographing apparatus of the present invention, a fixed focus-type photographing apparatus, which can inexpensively and simply increase a depth of field by disposing a removable light diffusion plate in an existing lens optical system, can be implemented.

In addition, according to the optical system of the present invention, an optical system applicable to the foregoing photographing apparatus may be implemented.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4(a) is a three-dimensional view of a light diffusion plate 115, FIG. 4(b) is a front view of a light diffusion plate 115, FIG. 4(c) is a partial sectional view of a light diffusion plate 115, and FIG. 4(d) is a partial sectional three-dimensional view of a light diffusion plate 115A serving as a modified example of a light diffusion plate 115;

FIG. 5(a) and FIG. 5(b) are diagrams respectively indicating relationships between a distance and a point spread function (PSF) when an optical system 110 does not include a light diffusion plate 115 and when the optical system 110 includes a light diffusion plate 115;

DESCRIPTION OF EMBODIMENTS

Several embodiments of the present invention are described below by referring to accompanying drawings.

Embodiment 1

Figure 1:
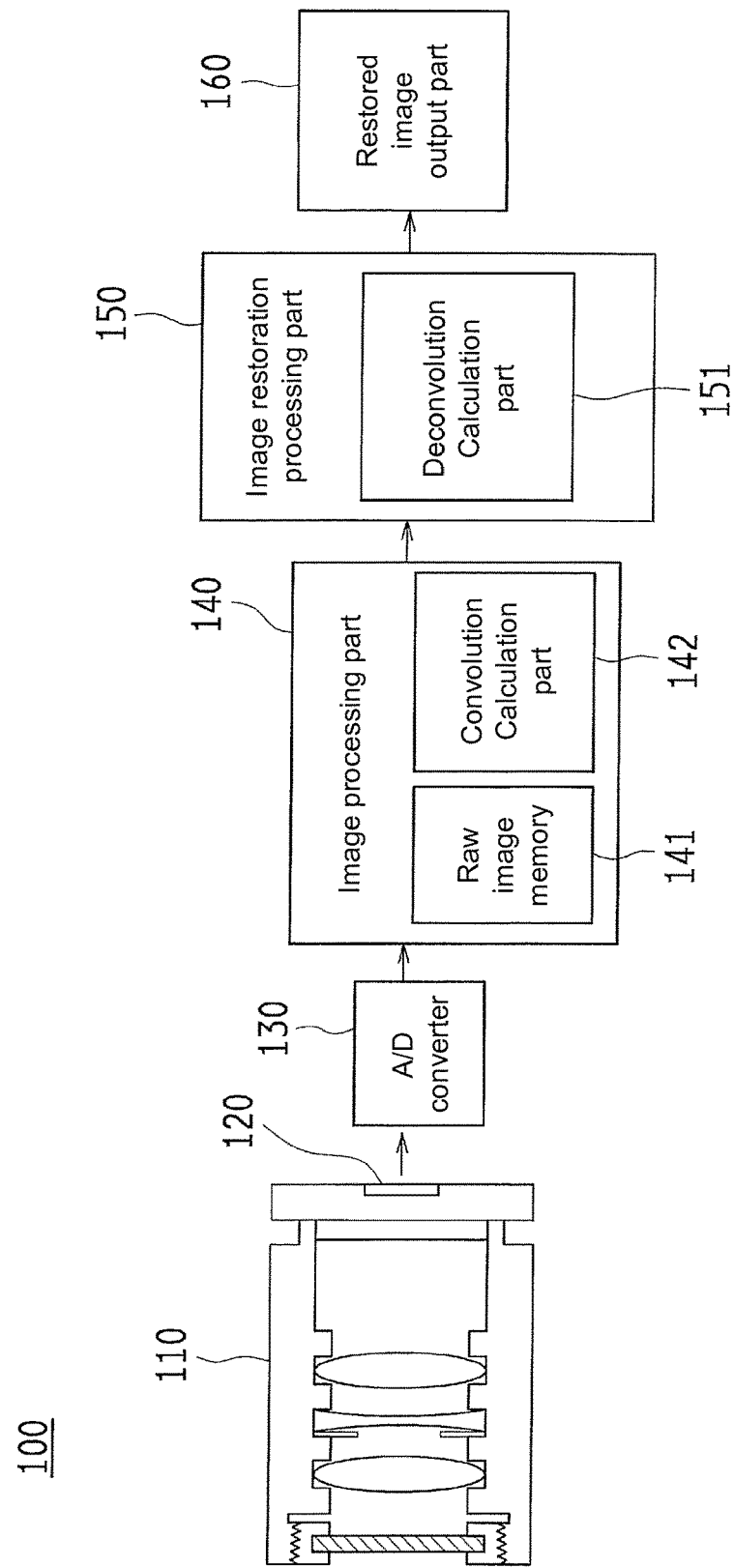
FIG. 1 is a block diagram illustrating a brief structure of a photographing apparatus 100 according to Embodiment 1 of the present invention.
Figure 2:
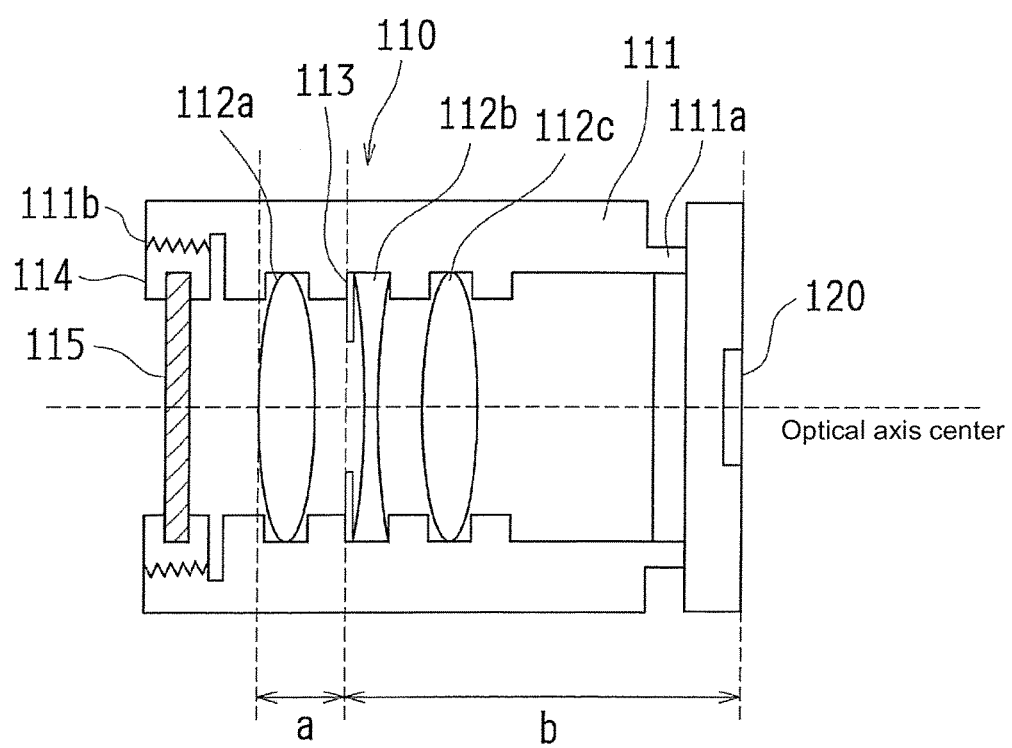
FIG. 2 is a sectional view of enlarging an optical system 110 of a photographing apparatus 100.

FIG. 1 is a block diagram illustrating a brief structure of a photographing apparatus 100 according to Embodiment 1 of the present invention. FIG. 2 is a sectional view of enlarging an optical system 110 of a photographing apparatus 100. Further, in the following description, a side (which is also a photographed object side) through which a light ray is incident onto an optical system is referred to as "front" (the left side in the diagram), and a side through which a light ray is emergent from an optical system is referred to as "rear" (the right side in the diagram).

As shown in FIG. 1, a photographing apparatus 100 includes: an optical system 110, including two or more than two lenses; a photographing element 120, disposed behind the optical system 110; an analog to digital (A/D) converter 130, which converts an analog signal output from the photographing element 120 to a digital signal; an image processing part 140, which includes a raw image memory 141 and a convolution calculation part 142 and performs image processing on image data of the digital signal output from the A/D converter 130; an image restoration processing part 150, which includes a deconvolution calculation part 151 and performs restoration processing on the image data on which the image processing part 140 has performed image processing; and a restored image output part 160, which outputs an image restored by the image restoration processing part 150.

As the photographing element 120, a charge coupled device (CCD) sensor, a complementary metal oxide semiconductor (CMOS) sensor, and a metal oxide semiconductor (MOS) sensor may be exemplified, which are not limited thereto. If the photographing element 120 can directly output a digital signal instead of an analog signal, the A/D converter 130 may be omitted.

The image processing part 140 and the image restoration processing part 150 do not need to be separate and may also be combined into one piece.

In addition, as shown in FIG. 2, the optical system 110 includes: a cylindrical lens barrel 111, which is provided with a connection ring part 111a on a rear end, is provided with a filter slot 111b on an inner surface of a front end part, and is replaceable; a first lens 112a, a second lens 112b, and a third lens (a final lens) 112c, which are sequentially disposed inside the lens barrel 111 starting from the front; a diaphragm 113, which is disposed right in front of the second lens 112b; and a light diffusion plate 115, which is retained on a retainer 114 that is screwed into the filter slot 111b.

Herein, a distance a and a distance b in the optical system 110 as specified below are characterized in that: a<b.

a: a distance from a front surface (a first surface) of the forefront first lens 112a to the diaphragm 113 b: a distance from the diaphragm 113 to (a photographing surface of) the photographing element 120

As the connection ring part 111a of the lens barrel 111, for example, a C support may be exemplified, but the present invention is not limited thereto.

The first lens 112a and the third lens 112c are set to be convex lenses, and the second lens 112b is set to be a concave lens, but the present invention is not limited to such a combination, and a total number of lenses is not limited to three.

The diaphragm 113 is an aperture diaphragm, and a disposition position thereof is not limited to the position as shown in the drawing.

The light diffusion plate 115 retained on the retainer 114 may be removed by rotating it along a direction of loosening the screw-in to the filter slot 111b, and therefore, can also be easily replaced by another light diffusion plate or optical element, or the like.

Figure 3:
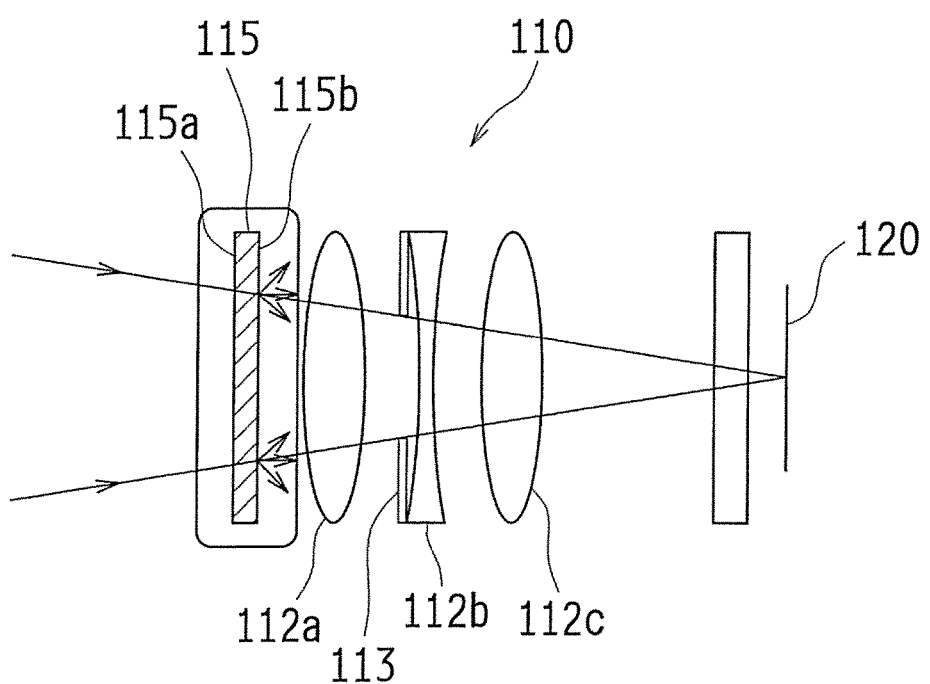
FIG. 3 is a brief structural diagram of an optical system 100 for illustrating a principle of increasing a depth of field.

FIG. 3 is a brief structural diagram of an optical system 100 for illustrating a principle of increasing a depth of field. FIG. 4(a) is a three-dimensional view of a light diffusion plate 115. FIG. 4(b) is a front view of a light diffusion plate 115. FIG. 4(c) is a partial sectional view of a light diffusion plate 115. FIG. 4(d) is a partial sectional three-dimensional view of a light diffusion plate 115A serving as a modified example of a light diffusion plate 115. FIG. 5(a) and FIG. 5(b) are diagrams respectively indicating relationships between a distance and a point spread function (PSF) when an optical system 110 does not include a light diffusion plate 115 and when the optical system 110 includes a light diffusion plate 115.

As shown in FIG. 3, in the light diffusion plate 115 disposed in the forefront of the optical system 110, the front surface 115a thereof is a plane, and a rear surface thereof forms a light diffusion surface 115b that diffuses light. As shown in FIG. 4(a) to FIG. 4(c), a section of the light diffusion surface 115b is a continuous shape with discontinuous height gaps, is saw-toothed, and is a circular ring structure of point symmetry. However, the present invention is not limited to such a sectional shape, and for example, the sectional shape may be a lens shape like the light diffusion plate 115A as shown in FIG. 4(d). In addition, although not shown in the drawing, the sectional shape may also be a shape such as a binary shape or a diffraction grating shape. A material of the light diffusion plate 115 or the light diffusion plate 115A is preferably a material, such as resin or glass, that can be formed by means of a mold.

If there is no light diffusion plate 115, as shown in FIG. 5(a), only if a focusing distance is slightly deviated, a spot diameter on the photographing element 120 is greatly increased. According to another aspect, if there is a light diffusion plate 115, as shown in FIG. 5(b), even if a focusing distance is slightly deviated, the spot diameter on the photographing element 120 is still almost not increased. That is, by means of the light diffusion plate 115 including the light diffusion surface 115b, light ray diffusion (the bokeh property) on the photographing element 120 can be approximately fixed in a distance direction.

Figure 6A:
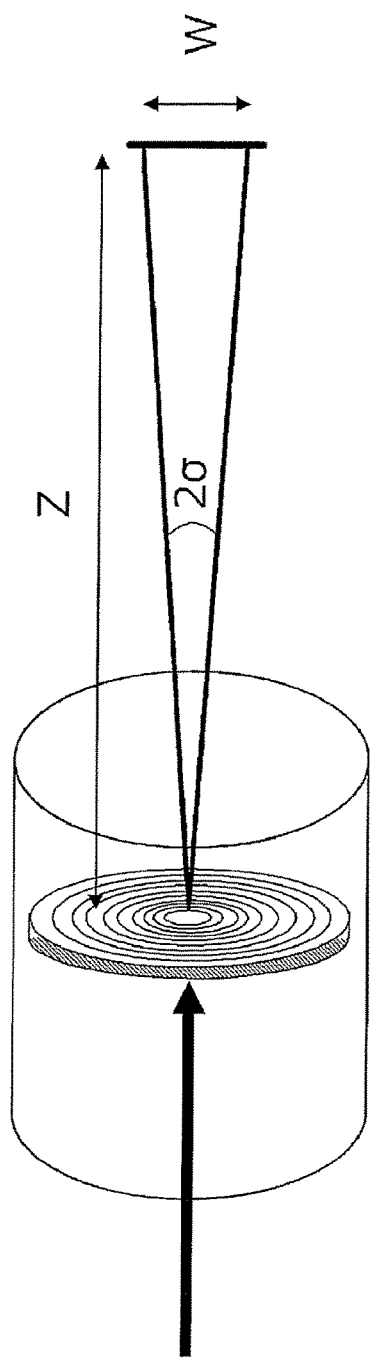
FIG. 6(a) is a brief illustrative diagram of a diffusion angle r of a light diffusion plate 115.
Figure 6B:
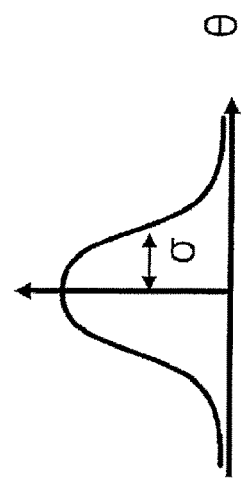
FIG. 6(b) is a curve diagram illustrating angle distribution of a PSF on a photographing element 120.

FIG. 6(a) is a brief illustrative diagram of a diffusion angle σ of a light diffusion plate 115. FIG. 6(b) is a curve diagram illustrating angle distribution of a PSF on a photographing element 120.

As shown in FIG. 6(a), the diffusion angle σ of the light diffusion plate 115 is defined to be a light diffusion angle on the photographing element 120 starting from an emergent light pupil surface of a lens. Based on a distance Z from the emergent light pupil surface of the lens to the photographing element 120, a light ray diffusion angle 2σ, and a diffusion width W on the photographing element 120, the diffusion angle σ (a bokeh amplitude) may be calculated by using the following equation:

$$\sigma = \tan^{-1}(W/Z)$$

Herein the angle distribution of a PSF on the photographing element 120 is shown in FIG. 6(b), and is set to be approximate Gaussian distribution.

Figures 7A, 7B:
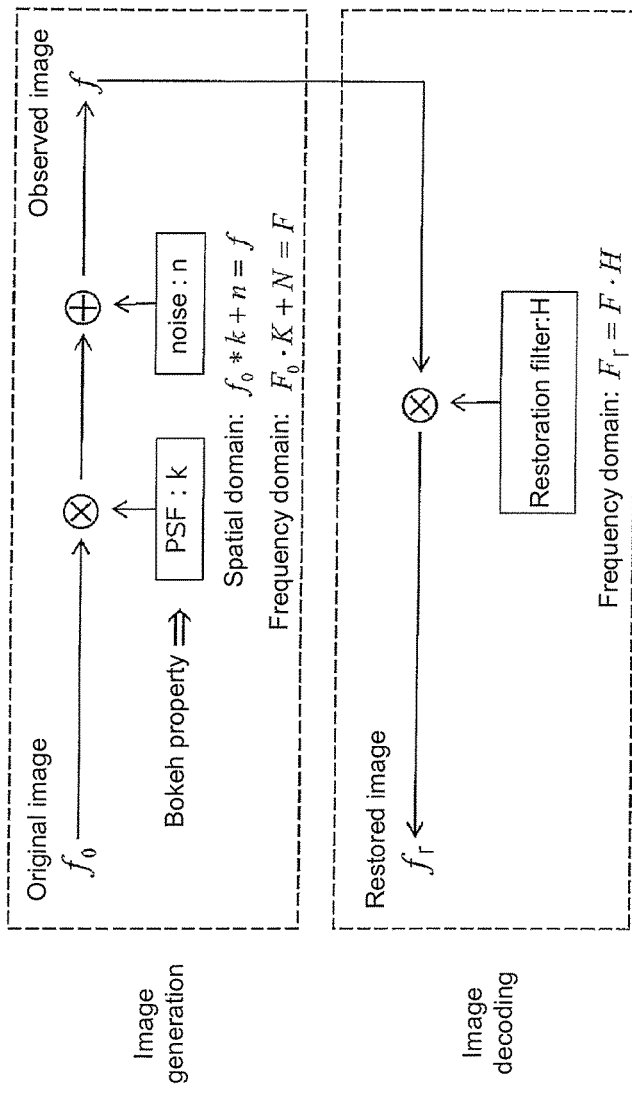
FIG. 7(a) is a brief illustrative diagram of an image restoration filter used in an image restoration processing part 150.
FIG. 7(b) shows a formula illustrating an example where a Wiener filter serves as a restoration filter.

FIG. 7(a) is a brief illustrative diagram of an image restoration filter used in an image restoration processing unit 150. FIG. 7(b) shows a formula illustrating an example where a Wiener filter serves as a restoration filter.

As shown in FIG. 7(a), an original image fo is multiplied by a PSF (k) that serves as the bokeh property and is added with noise (n) to obtain an observed image f. The relationship may be represented by using the following equation in a spatial domain:

$$fo * k + n = f$$

In addition, the relationship may be represented by using the following equation in a frequency domain:

$$Fo \cdot K + N = F$$

Herein, Fo, K, N, and F respectively correspond to the original image, PSF, noise, and observed image.

Therefore, a restored image fr may be generated by tracing the reversed process and using the observed image f. Specifically, the restored image Fr may be generated by previously calculating a restoration filter (H) of a frequency domain that traces the reversed process and multiplying the observed image F by the restoration filter (H). Further, the above is common content to those skilled in the art, so that detailed descriptions are omitted.

If the bokeh property is even in the screen (in the image height of the photographing element 120), the restored image also become an evenly-focused image.

As restoration filter (H), for example, the Wiener filter as shown in FIG. 7(b) may be applied, but the present invention is not limited thereto. If, instead, an FIR filter is used, approximation is performed on the spatial calculation in the Wiener filter, and a fast Fourier transform (FFT) calculation is not needed, so that an effect of shortening a processing time is produced.

Figure 8C:
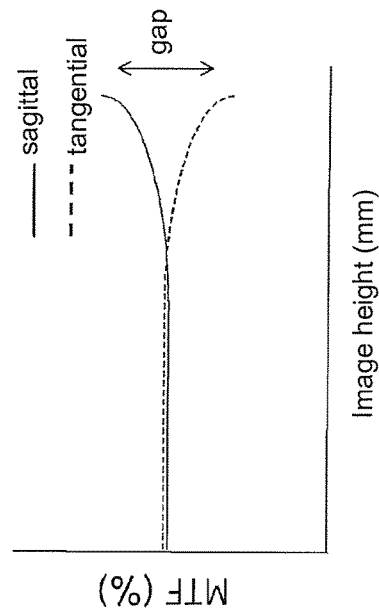
FIG. 8(c) is a curve diagram of respectively illustrating a change of an MTF generated because of an image height with respect to each sagitta and each tangent.
Figure 8D:
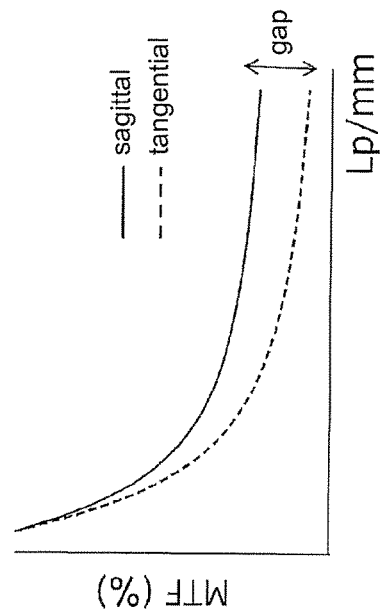
FIG. 8(d) is a curve diagram of respectively illustrating a spatial frequency property of an MTF with respect to each sagitta and each tangent.
Figure 8A:
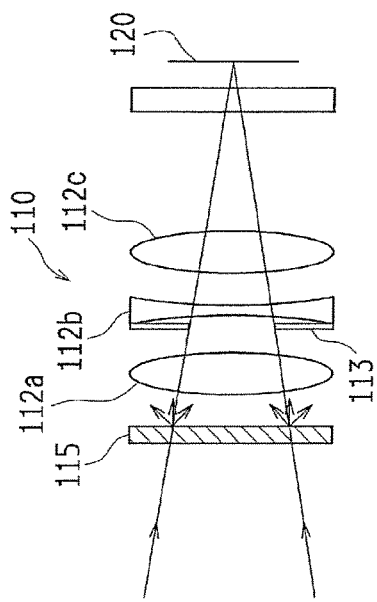
FIG. 8(a) is a brief structural diagram of an optical system 110 for illustrating that when a diaphragm 113 is open, the optical system 110 generates performance degradation because of an image height inside a screen.
Figure 8B:
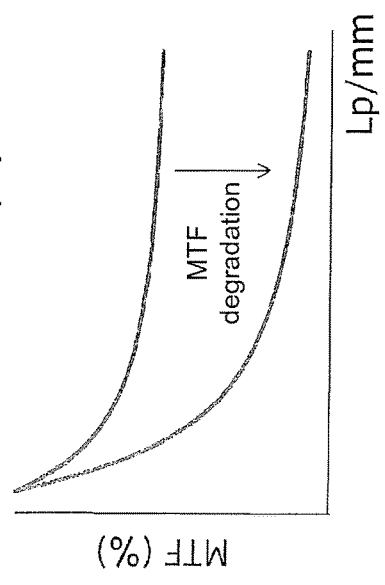
FIG. 8(b) is a curve diagram illustrating a spatial frequency property of a modulation transfer function (MTF)

FIG. 8(a) is a brief structural diagram of an optical system 110 for illustrating that when a diaphragm 113 is open, the optical system 110 generates performance degradation because of an image height inside a screen. FIG. 8(b) is a curve diagram illustrating a spatial frequency property of an MTF. FIG. 8(c) is a curve diagram of respectively illustrating a change of an MTF generated because of an image height with respect to each sagitta and each tangent; FIG. 8(d) is a curve diagram of respectively illustrating a spatial frequency property of an MTF with respect to each sagitta and each tangent.

As shown in FIG. 8(a), when the light diffusion plate 115 or an element such as a phase plate is inserted into the optical system 110, and as shown in FIG. 8(b), performance degradation caused by the image height in the screen would be generated. In particular, as shown in FIG. 8(c) and FIG. 8(d), differences of a sagitta and a tangent inside a field of view become a problem.

Figure 9C:
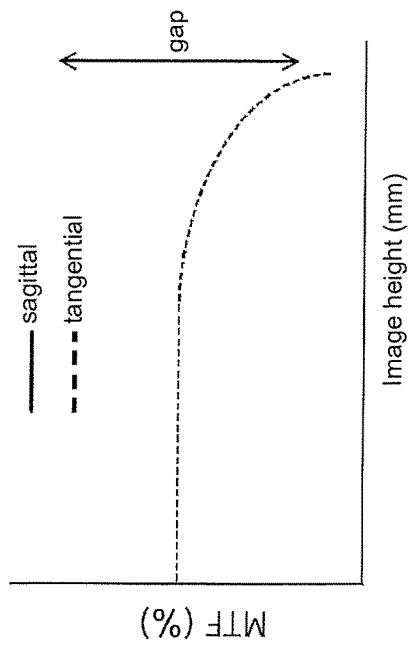
FIG. 9(c) is a curve diagram of respectively illustrating a change of an MTF generated because of an image height with respect to each sagitta and each tangent.
Figure 9D:
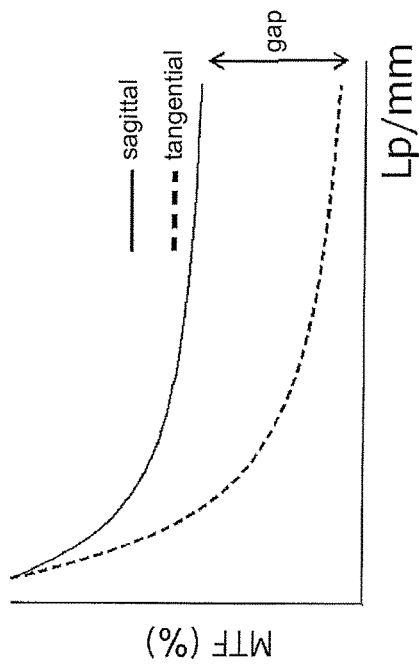
FIG. 9(d) is a curve diagram of respectively illustrating a spatial frequency property of an MTF with respect to each sagitta and each tangent.
Figure 9A:
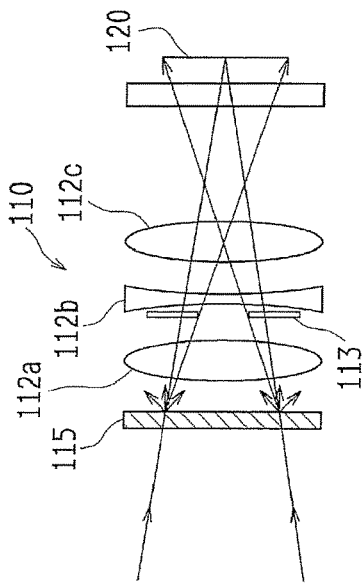
FIG. 9(a) is a brief structural diagram of an optical system 110 for illustrating that when an F value is grater, the optical system 110 generates performance degradation because of an image height inside a screen.
Figure 9B:
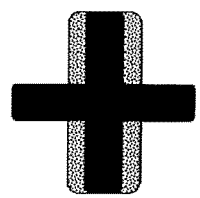
FIG. 9(b) is an image map of a situation where performance degradation of a tangent is greater than that of a sagitta.

FIG. 9(a) is a brief structural diagram of an optical system 110 for illustrating that when an F value is grater, the optical system 110 generates performance degradation because of an image height inside a screen. FIG. 9(b) is an image map of a situation where performance degradation of a tangent is greater than that of a sagitta. FIG. 9(c) is a curve diagram of respectively illustrating a change of an MTF generated because of an image height with respect to each sagitta and each tangent. FIG. 9(d) is a curve diagram of respectively illustrating a spatial frequency property of an MTF with respect to each sagitta and each tangent.

In the optical system 110 shown in FIG. 8(a), if an F value is increased as shown in FIG. 9(a), performance degradation generated because of the image height in the screen is further increased. For example, when the original image fo is a cross, as shown in FIG. 9(b), bokeh only occurs above and below a cross rod. However, as shown in FIG. 9(c) and FIG. 9(d), the differences of the sagitta and the tangent inside the field of view are respectively enlarged as compared with those of FIG. 8(c) and FIG. 8(d).

Figure 10:
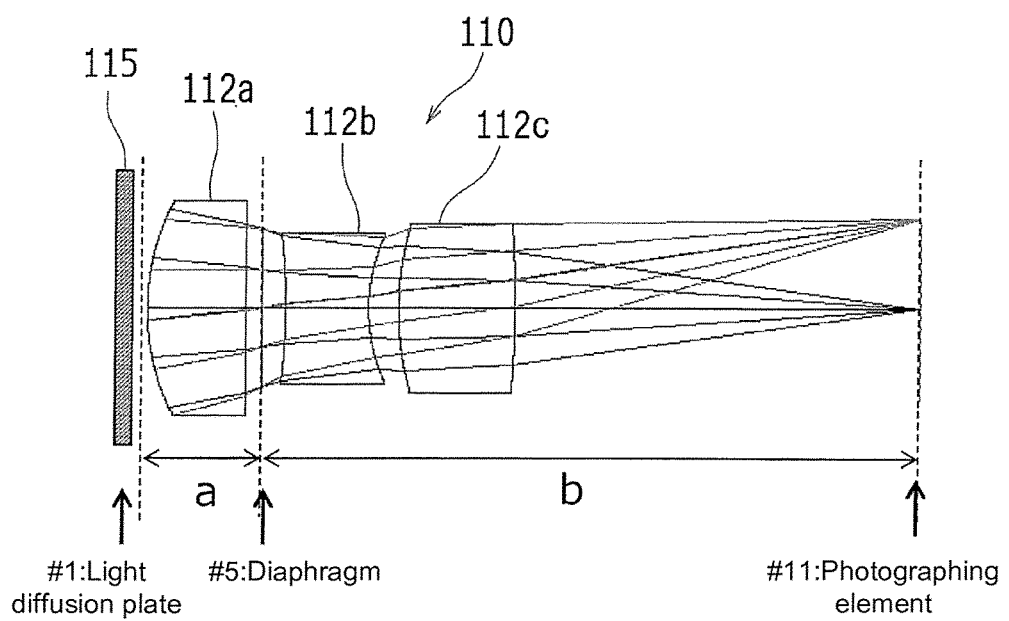
FIG. 10 is a brief diagram illustrating a specific design example of an optical system 110.
Figure 11A:
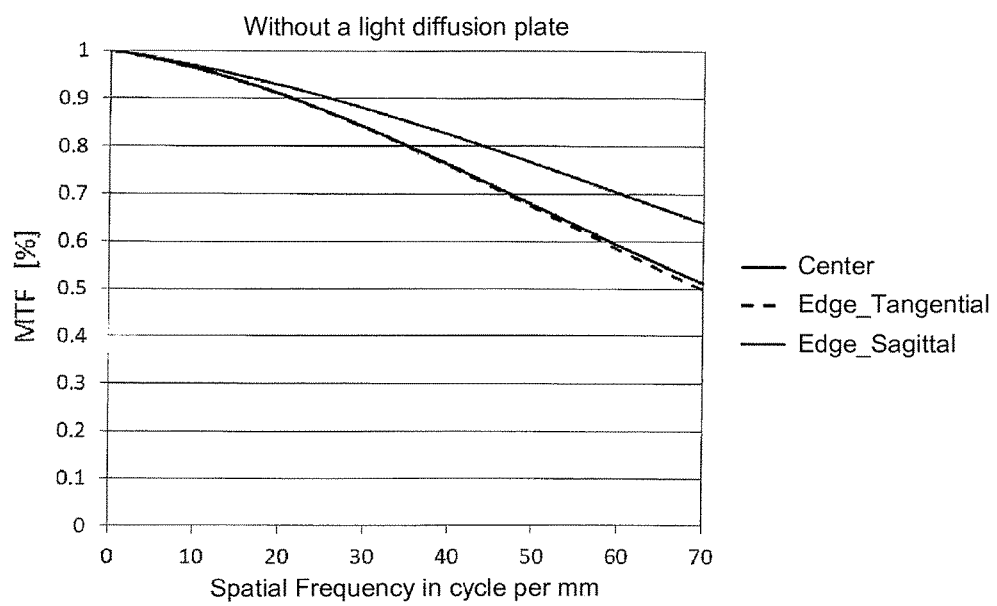
FIG. 11(a) and FIG. 11(b) are curve diagrams respectively illustrating optical properties when there is no light diffusion plate 115 and when there is a light diffusion plate 115.
Figure 11B:
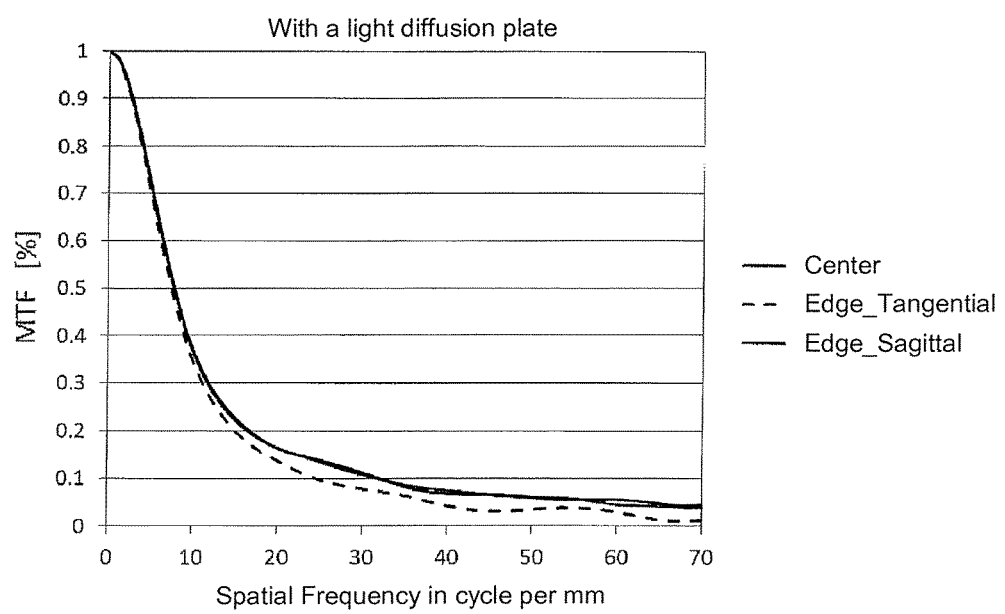
Figure 12:
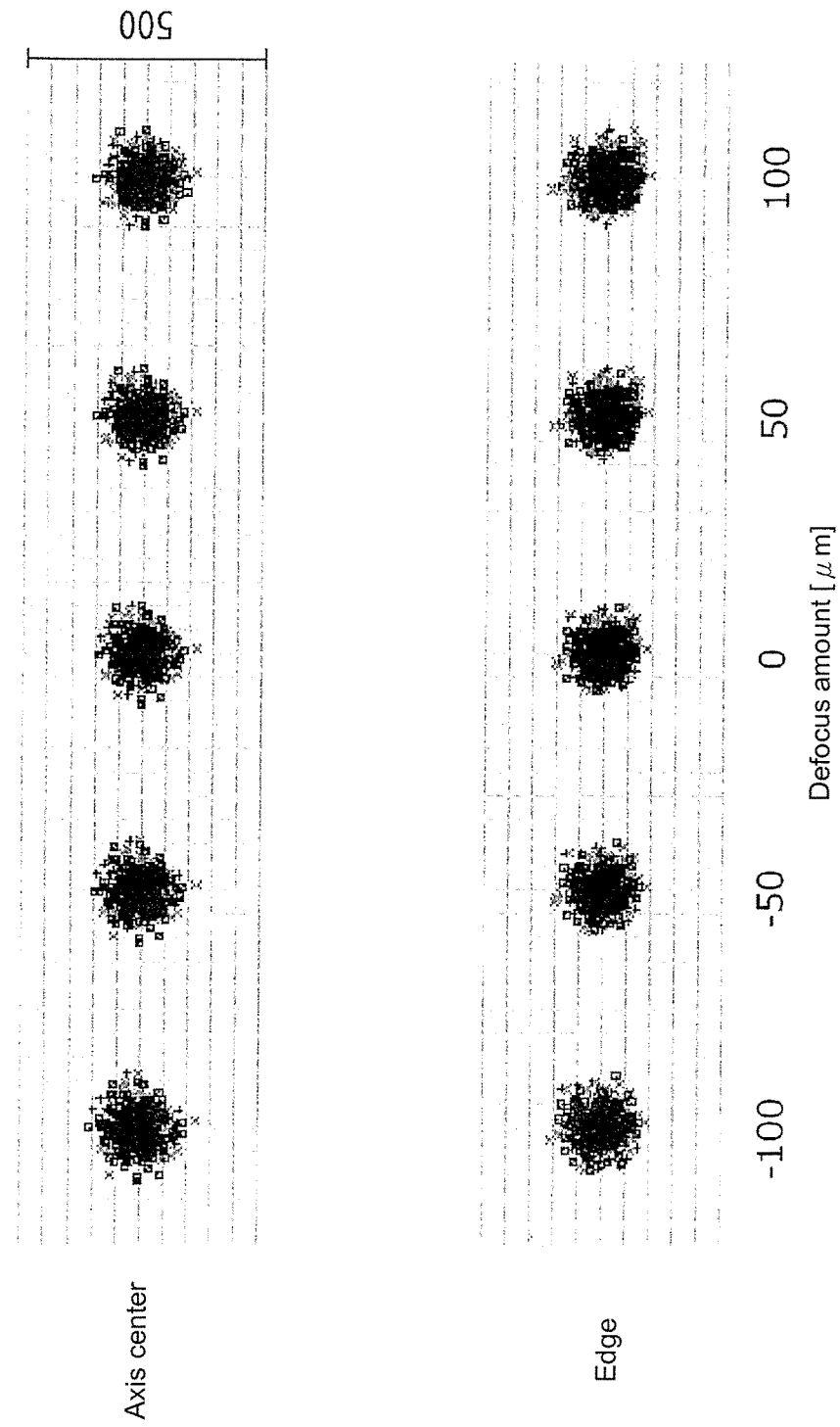
FIG. 12 shows an optical simulation result when there is a light diffusion plate 115.

FIG. 10 is a brief diagram illustrating a specific design example of an optical system 110. Table 1 shows optical data of the design example. FIG. 11(a) and FIG. 11(b) are curve diagrams respectively illustrating optical properties when there is no light diffusion plate 115 and when there is a light diffusion plate 115. FIG. 12 shows an optical simulation result when there is a light diffusion plate 115.

TABLE 1

| # | Radius | Thickness | Glass | Semi-Diameter |
|---|--------|-----------|-------|---------------|
| 0 | Infinity | 300.00 | | 38.4 |
| 1 | Infinity | 1.00 | ACRYLIC | 5.38 |
| 2 | Infinity | 1.00 | | 5.31 |
| 3 | 7.00 | 3.00 | S-LAM59 | 4.97 |
| 4 | −348.80 | 0.50 | | 4.58 |
| 5 | Infinity | 0.70 | | 4.09 |
| 6 | −18.74 | 2.50 | S-TIH14 | 3.79 |
| 7 | 5.28 | 0.90 | | 2.74 |
| 8 | 8.90 | 3.50 | S-LAM7 | 2.70 |
| 9 | −31.00 | 1.00 | | 2.17 |
| 10 | Infinity | 10.89 | | 1.77 |
| 11 | Infinity | 0.00 | | 2.70 |

As shown in FIG. 10 and Table 1, the design example is a triplet lens whose focal distance f=20 mm and F value=3.0, and when a distance to a photograph object is 300 mm, a radius of a field of view is 38.4 mm. A diffusion angle of the light diffusion plate is 0.1°.

Items following a second column of the optical data respectively represent a curvature radius, a gap, a material, and a surface radius. Further, the so-called infinite curvature radius indicates that here is a plane.

In the optical data, #0 following a second row corresponds to a photographed object, #1 corresponds to a front surface of the light diffusion plate 115, #2 corresponds to a diffusion surface of the light diffusion plate 115, #3 and #4 corresponds to two surfaces of the first lens 112a, #5 corresponds to the diaphragm 113, #6 and #7 correspond to two surfaces of the second lens 112b, #8 and #9 correspond to two surfaces of the third lens 112c, #10 corresponds to a distance (a space) from the third lens 112c to the photographing element 120, and #11 corresponds to the photographing element 120.

FIG. 11(a) shows an optical property when there is no light diffusion plate 115, and FIG. 11(b) shows an optical property when there is a light diffusion plate 115.

In addition, FIG. 12 indicates an axis center and a peripheral spot diameter on the photographing element 120 in a defocusing range in an optical axis direction, and it could be known that the spot diameter is approximately even at the axis center and edge.

Figure 13A:
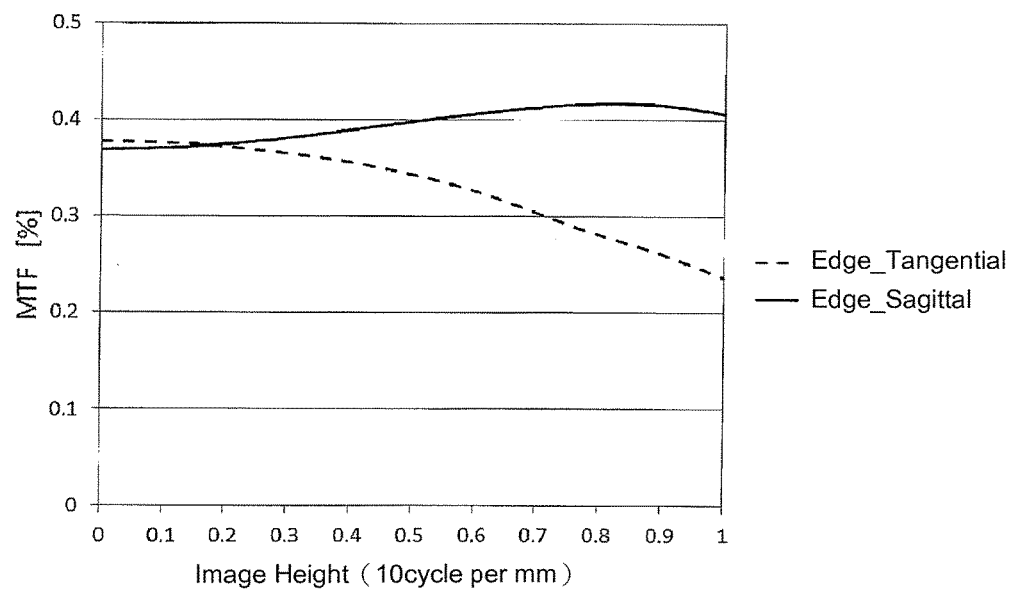
FIG. 13(a) is a curve diagram of changes of an MTF that are generated because of an image height and that are respectively obtained by means of simulation with respect to each sagitta and tangent on an edge of a photographing element 120 when an optical system 110 satisfies a relationship: a>b (which does not conform to Embodiment 1)
Figure 13B:
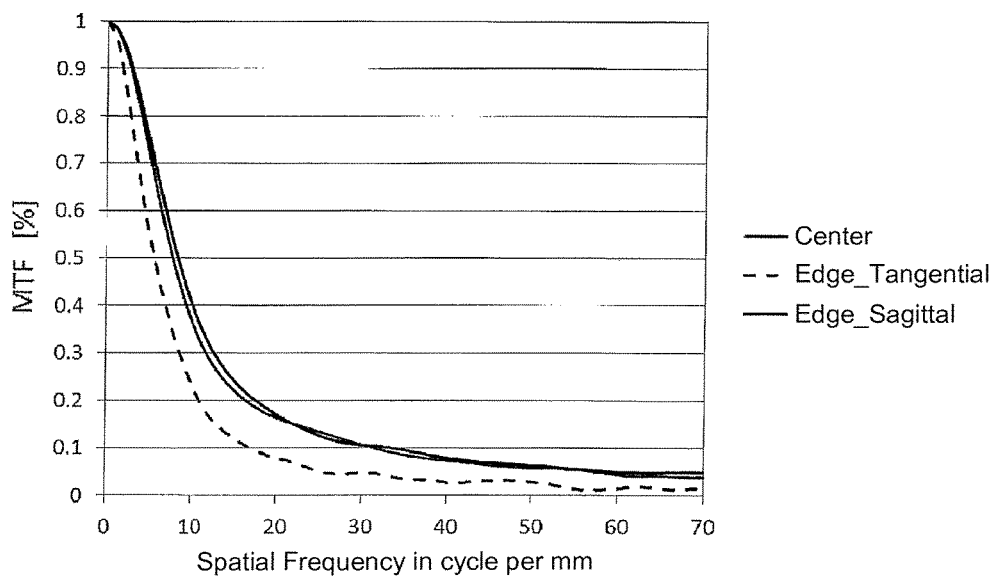
FIG. 13(b) is a curve diagram of spatial frequency properties of an MTF that are respectively obtained by means of simulation with respect to each sagitta and tangent at an axis center and on an edge of a photographing element 120 under the same situation.

FIG. 13(a) is a curve diagram of changes of an MTF that are generated because of an image height and that are respectively obtained by means of simulation with respect to each sagitta and tangent on an edge of a photographing element 120 when an optical system 110 satisfies a relationship: a>b (which does not conform to Embodiment 1). FIG. 13(b) is a curve diagram of spatial frequency properties of an MTF that are respectively obtained by means of simulation with respect to each sagitta and tangent at an axis center and on an edge of a photographing element 120 under the same situation.

Figure 14A:
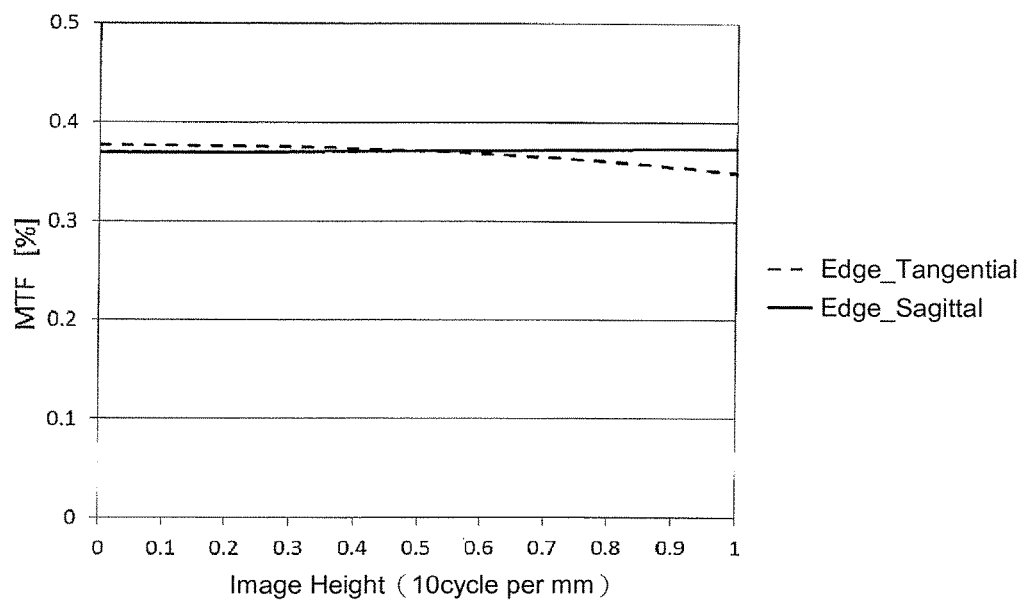
FIG. 14(a) is a curve diagram of changes of an MTF that are generated because of an image height and that are respectively obtained by means of simulation with respect to each sagitta and tangent on an edge of a photographing element 120 when an optical system 110 satisfies a relationship: a<b (which conforms to Embodiment 1)
Figure 14B:
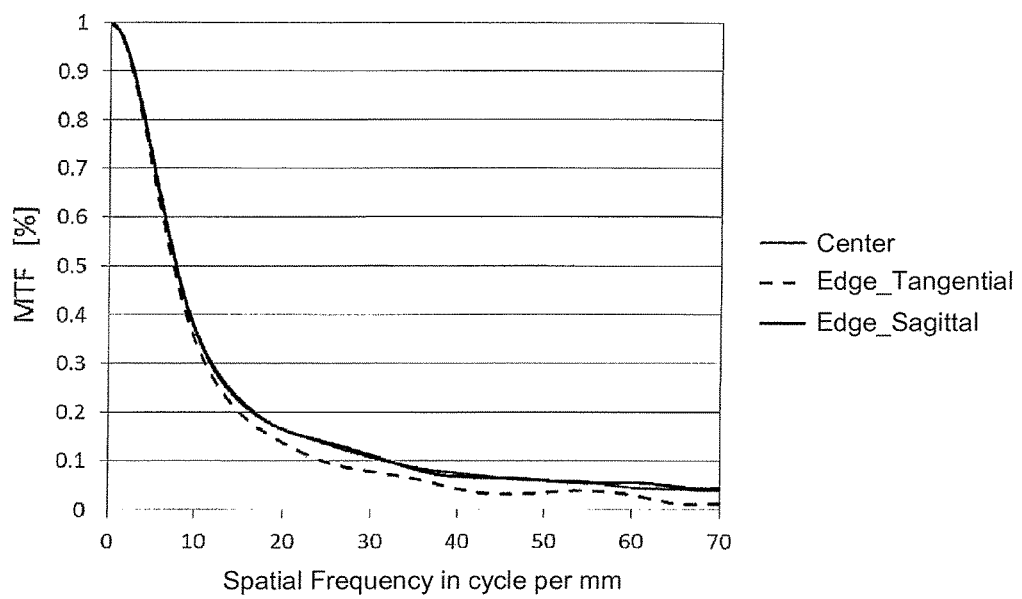
FIG. 14(b) is a curve diagram of spatial frequency properties of an MTF that are respectively obtained by means of simulation with respect to each sagitta and tangent at an axis center and on an edge of a photographing element 120 under the same situation.

In addition, FIG. 14(a) is a curve diagram of changes of an MTF that are generated because of an image height and that are respectively obtained by means of simulation with respect to each sagitta and tangent on an edge of a photographing element 120 when an optical system 110 satisfies a relationship: a<b (which conforms to Embodiment 1). FIG. 14(b) is a curve diagram of spatial frequency properties of an MTF that are respectively obtained by means of simulation with respect to each sagitta and tangent at an axis center and on an edge of a photographing element 120 under the same situation.

The foregoing description is made by referring to FIG. 8(c) and FIG. 8(d), and when the optical system 110 satisfies a relationship: a>b, as shown in FIG. 13(a), differences of a sagitta and a tangent inside a field of view are increased. In particular, when on an edge of the field of view, an MTF of a tangent is greatly reduced, it is possible to hinder normal reading of a two-dimensional code.

According to another aspect, when the optical system 110 as stated in Embodiment 1 satisfies a relationship: a<b, as shown in FIG. 14(a), the MTFs of the sagitta and tangent are maintained relatively high until the edge of the field of view, and a difference between the two is also extremely small, so it is impossible to hinder reading of a two-dimensional code.

Figure 15A:
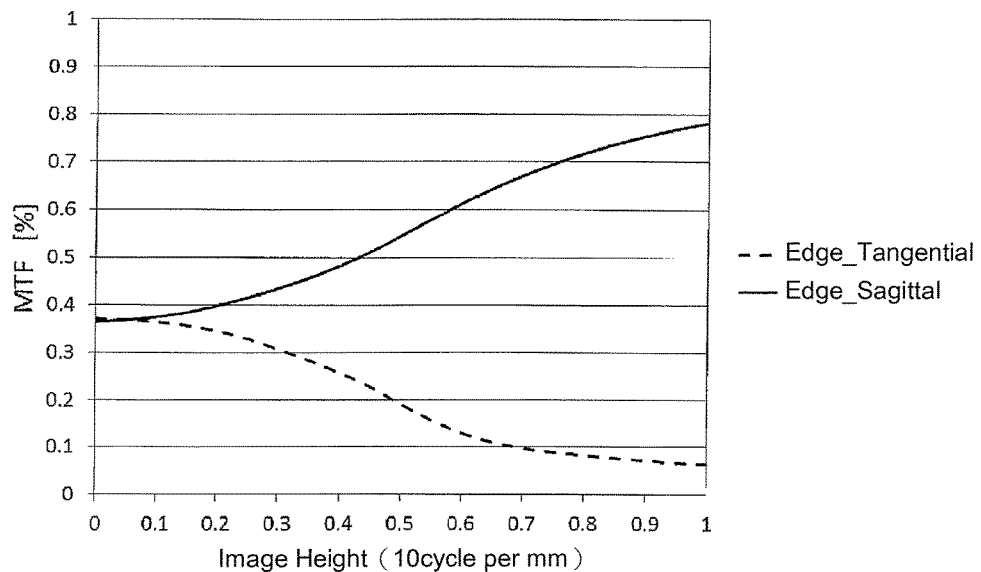
FIG. 15(a) is a curve diagram of changes of an MTF that are generated because of an image height and that are respectively obtained by means of simulation with respect to each sagitta and tangent on an edge of a photographing element 120 when an optical system 110 satisfies a relationship: a>b (which does not conform to Embodiment 1) and an F value is great (F8.0)
Figure 15B:
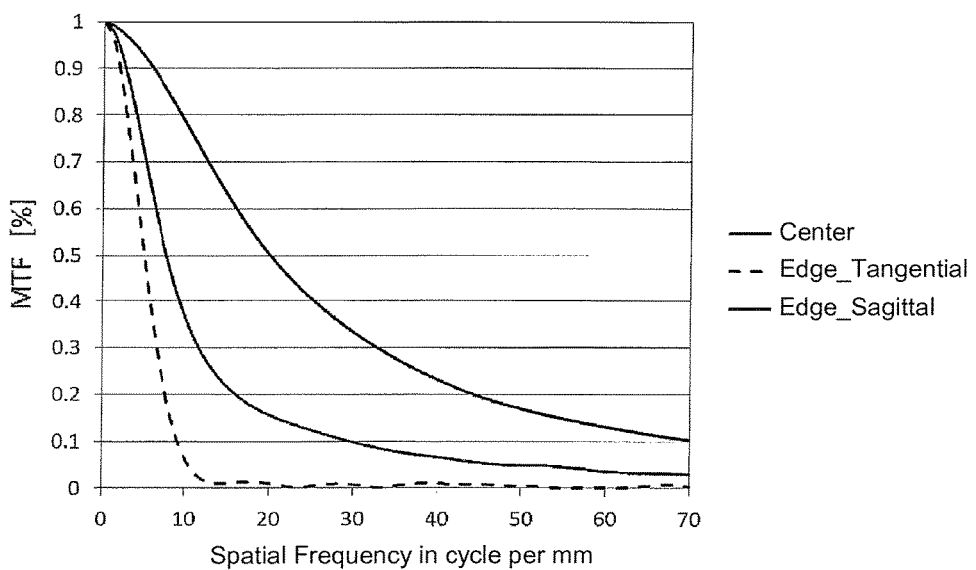
FIG. 15(b) is a curve diagram of spatial frequency properties of an MTF that are respectively obtained by means of simulation with respect to each sagitta and tangent at an axis center and on an edge of a photographing element 120 under the same situation.

FIG. 15(a) is a curve diagram of changes of an MTF that are generated because of an image height and that are respectively obtained by means of simulation with respect to each sagitta and tangent on an edge of a photographing element 120 when an optical system 110 satisfies a relationship: a>b (which does not conform to Embodiment 1) and an F value is great (F8.0). FIG. 15(b) is a curve diagram of spatial frequency properties of an MTF that are respectively obtained by means of simulation with respect to each sagitta and tangent at an axis center and on an edge of a photographing element 120 under the same situation.

Figure 16A:
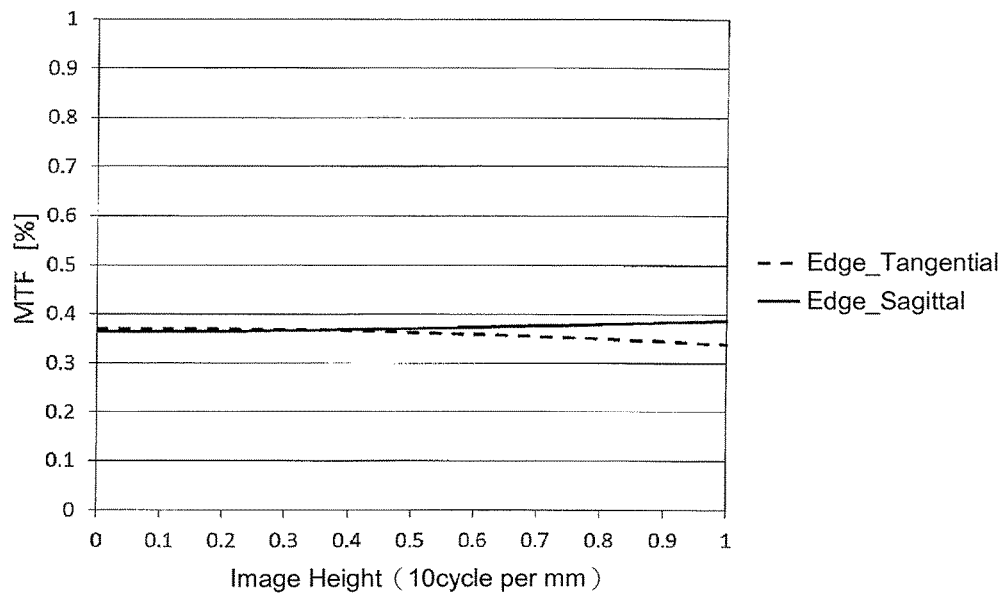
FIG. 16(a) is a curve diagram of changes of an MTF that are generated because of an image height and that are respectively obtained by means of simulation with respect to each sagitta and tangent on an edge of a photographing element 120 when an optical system 110 satisfies a relationship: a<b (which conforms to Embodiment 1) and an F value is great (F8.0)
Figure 16B:
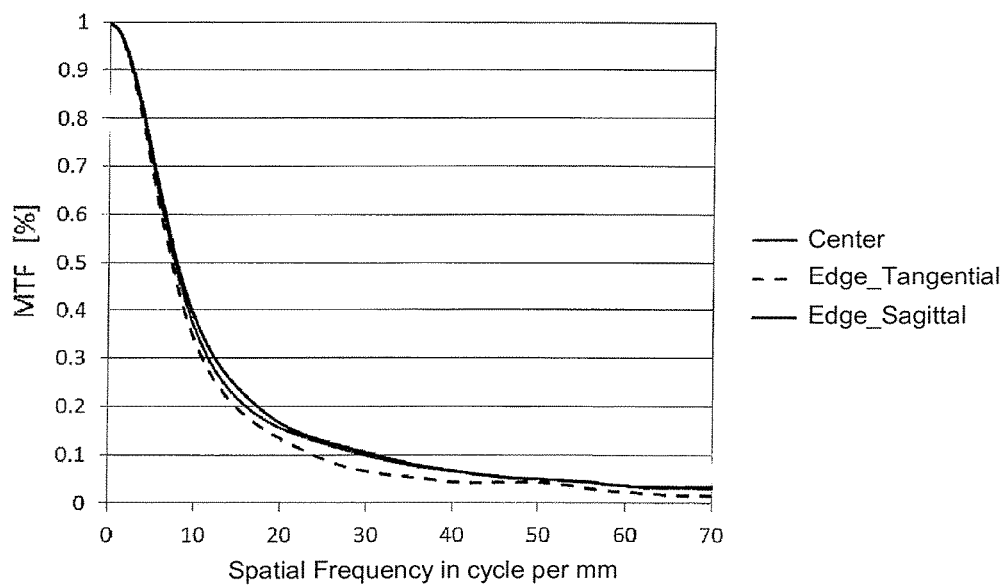
FIG. 16(b) is a curve diagram of spatial frequency properties of an MTF that are respectively obtained by means of simulation with respect to each sagitta and tangent at an axis center and on an edge of a photographing element 120 under the same situation.

In addition, FIG. 16(a) is a curve diagram of changes of an MTF that are generated because of an image height and that are respectively obtained by means of simulation with respect to each sagitta and tangent on an edge of a photographing element 120 when an optical system 110 satisfies a relationship: a<b (which conforms to Embodiment 1) and an F value is great (F8.0). FIG. 16(b) is a curve diagram of spatial frequency properties of an MTF that are respectively obtained by means of simulation with respect to each sagitta and tangent at an axis center and on an edge of a photographing element 120 under the same situation.

The foregoing description is made by referring to FIG. 9(c) and FIG. 9(d), and when the optical system 110 satisfies a relationship: a>b, as shown in FIG. 15(a), differences of a sagitta and a tangent inside a field of view are further increased. In particular, when on an edge of the field of view, an MTF of a tangent is greatly reduced, the possibility of hindering normal reading of a two-dimensional code increases.

According to another aspect, when the optical system 110 as stated in Embodiment 1 satisfies a relationship: a<b, as shown in FIG. 16(a), the MTFs of the sagitta and tangent are maintained relatively high until the edge of the field of view, and a difference between the two is also extremely small, so it is impossible to hinder reading of a two-dimensional code.

According to Embodiment 1 described above, a spot size of the whole image height region including the edge of the image is enabled to be approximately even, so that an image with a favorable depth of field can also be obtained in a restored image.

Because an existing optical system is utilized, a structure of the optical system can be further simplified, so as to enable the spot size of the whole image to be approximately even, and an image that improves the restored image in signal processing can be provided. Moreover, a diffusion plate can be used among existing lenses to serve as an additional piece without performing lens designing and forming dedicated to enlargement of the depth of field and also without forming molds and the like that spend initial costs, so that a system can be constructed extremely inexpensively.

When the present invention is disposed in an inspection device of a factory and the like, with respect to the assembling a phase plate into the interior of an optical system the prior art documents as stated in the Background of the Invention part, because a depth of field is increased in advance, it is difficult to perform focalization toward the most optimal position (a center of the depth of field), and on the contrary, according to Embodiment 1 of the present invention, initial adjustment on the focus position can be performed in a state where the light diffusion plate 115 is removed, and the setting can also be easily performed even without detailed optical knowledge.

In addition, when a camera for inspection is used, there are a lot of common vibrations in a factory, so that increasing an F value to increase a depth of field or increasing a stop speed is considered. However, if the F value is increased, the brightness is not enough, and it is difficult to achieve a high stop speed that can suppress an effect of vibration. According to Embodiment 1 of the present invention, the depth of field can be increased without change an F value (the brightness).

Embodiment 2

The following description replaces the optical system 110 of the photographing apparatus 100 of Embodiment 1 with a photographing apparatus of an optical system 210 of a different structure to serve as Embodiment 2 of the present invention. Further, the same components and the like are marked with the same reference numbers, and the differences are mainly described.

Figure 17:
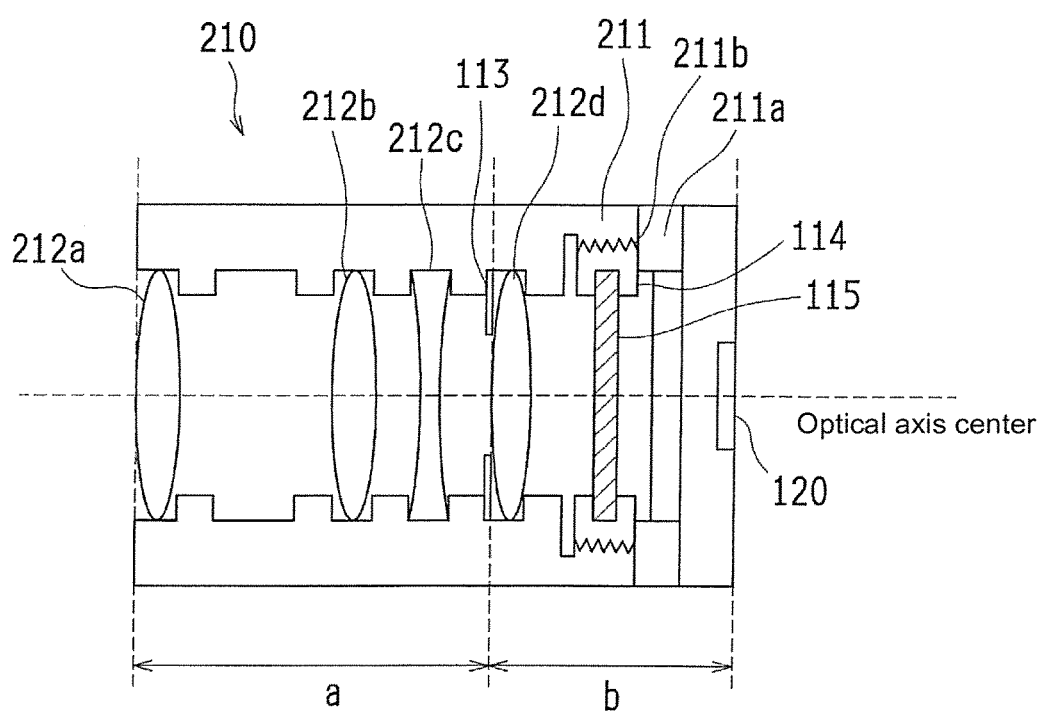
FIG. 17 is a sectional view of an optical system 210 of a photographing apparatus according to Embodiment 2 of the present invention.

FIG. 17 is a sectional view of an optical system 210 of a photographing apparatus according to Embodiment 2 of the present invention.

In addition, as shown in FIG. 17, the optical system 210 includes: a cylindrical lens barrel 211, which is provided with a connection ring part 211a on a rear end, is provided with a filter slot 111b on an inner surface nearby the connection ring part 211a, and is replaceable; a first lens 212a, a second lens 212b, a third lens 212c, and a fourth lens (a final lens) 212d which are sequentially disposed inside the lens barrel 211 starting from the front; a diaphragm 212, which is disposed right in front of the second lens 212b; and a light diffusion plate 115, which is retained on a retainer 114 that is screwed into the filter slot 211b.

Herein, a distance a and a distance b in the optical system 210 as specified below are characterized in that: a<b.

a: a distance from a front surface (a first surface) of the forefront first lens 212a to the diaphragm 113 b: a distance from the diaphragm 113 to (a photographing surface of) the photographing element 120

Figure 18A:
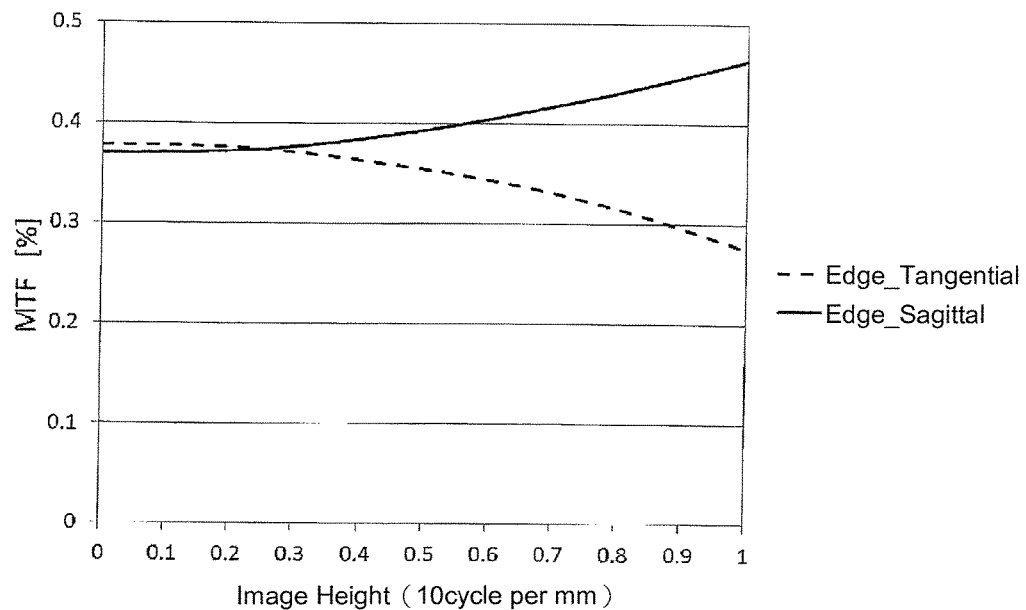
FIG. 18(a) is a curve diagram of changes of an MTF that are generated because of an image height and that are respectively obtained by means of simulation with respect to each sagitta and tangent on an edge of a photographing element 120 when an optical system 210 satisfies a relationship: a<b (which does not conform to Embodiment 2)
Figure 18B:
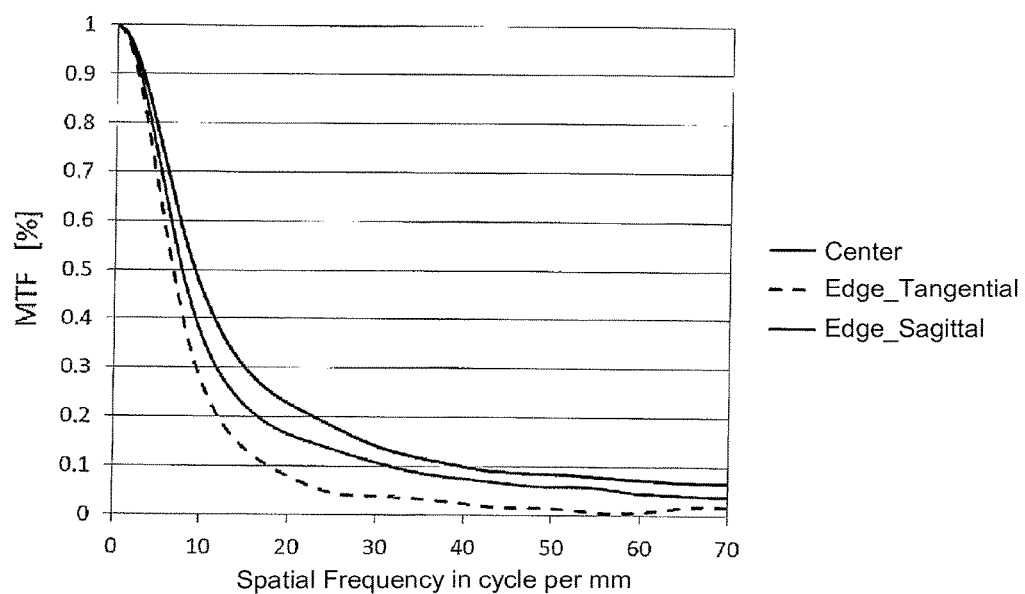
FIG. 18(b) is a curve diagram of spatial frequency properties of an MTF that are respectively obtained by means of simulation with respect to each sagitta and tangent at an axis center and on an edge of a photographing element 120 under the same situation.

FIG. 18(a) is a curve diagram of changes of an MTF that are generated because of an image height and that are respectively obtained by means of simulation with respect to each sagitta and tangent on an edge of a photographing element 120 when an optical system 210 satisfies a relationship: a<b (which does not conform to Embodiment 2). FIG. 18(b) is a curve diagram of spatial frequency properties of an MTF that are respectively obtained by means of simulation with respect to each sagitta and tangent at an axis center and on an edge of a photographing element 120 under the same situation.

Figure 19A:
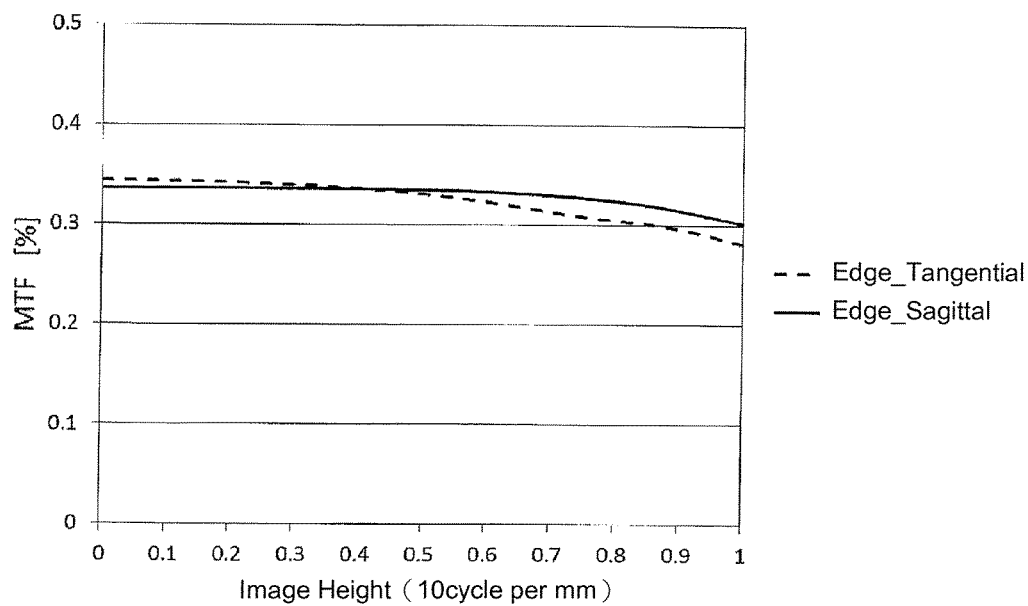
FIG. 19(a) is a curve diagram of changes of an MTF that are generated because of an image height and that are respectively obtained by means of simulation with respect to each sagitta and tangent on an edge of a photographing element 120 when an optical system 210 satisfies a relationship: a>b (which conforms to Embodiment 2)
Figure 19B:
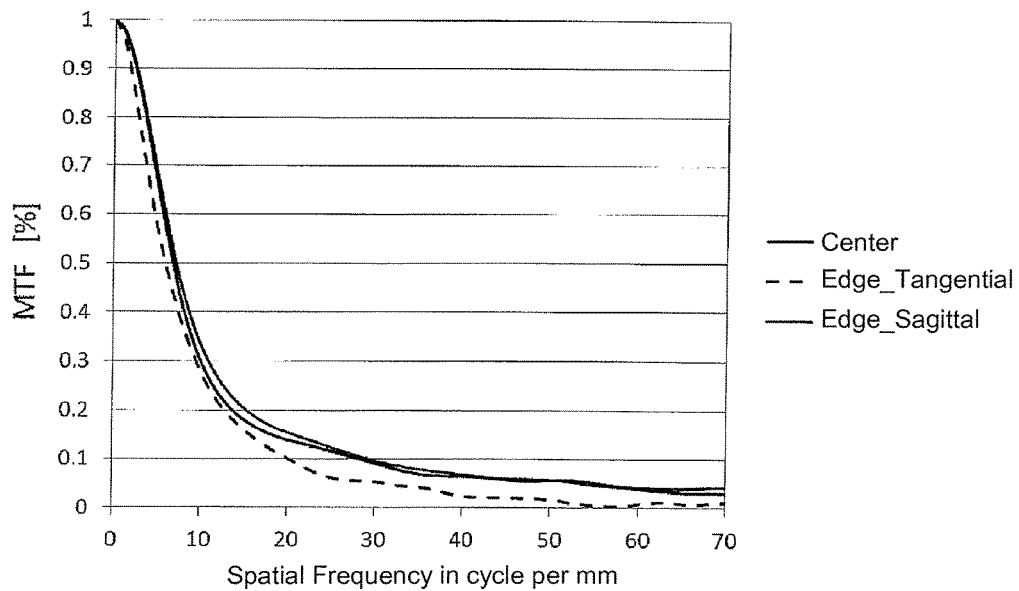
FIG. 19(b) is a curve diagram of spatial frequency properties of an MTF that are respectively obtained by means of simulation with respect to each sagitta and tangent at an axis center and on an edge of a photographing element 120 under the same situation.

In addition, FIG. 19(a) is a curve diagram of changes of an MTF that are generated because of an image height and that are respectively obtained by means of simulation with respect to each sagitta and tangent on an edge of a photographing element 120 when an optical system 210 satisfies a relationship: a>b (which conforms to Embodiment 2). FIG. 19(b) is a curve diagram of spatial frequency properties of an MTF that are respectively obtained by means of simulation with respect to each sagitta and tangent at an axis center and on an edge of a photographing element 120 under the same situation.

When the optical system 210 satisfies a relationship: a<b, as shown in FIG. 18(a), differences of a sagitta and a tangent inside a field of view are increased. In particular, when on an edge of the field of view, an MTF of a tangent is greatly reduced, it is possible to hinder normal reading of a two-dimensional code.

According to another aspect, when the optical system 210 as stated in Embodiment 2 satisfies a relationship: a>b, as shown in FIG. 19(a), the MTFs of the sagitta and tangent are maintained high until the edge of the field of view, and a difference between the two is also extremely small, so it is impossible to hinder reading of a two-dimensional code.

According Embodiment 2 described above, effects the same as those of Embodiment 1 can also be obtained.

With Respect to Modified Example of Respective Embodiments and Positions of the Light Diffusion Plate 115

Figures 20A, 20B:
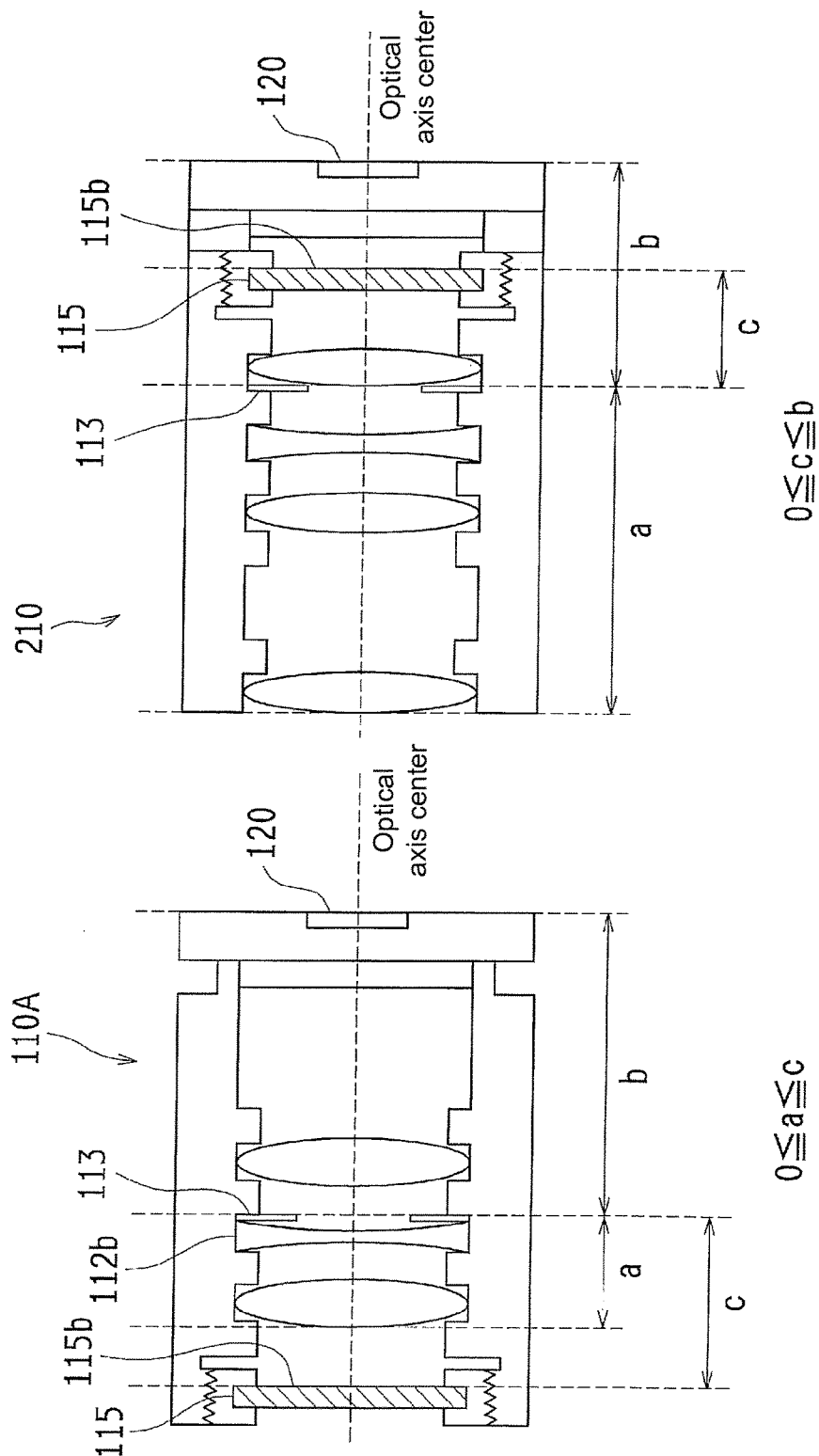
FIG. 20(a) is a sectional view of an optical system 110A that serves as a modified example of an optical system 110 of a photographing apparatus 100 of Embodiment 1 of the present invention.
FIG. 20(b) is a sectional view of an optical system 210 of a photographing apparatus according to Embodiment 2 of the present invention.
Figure 21:
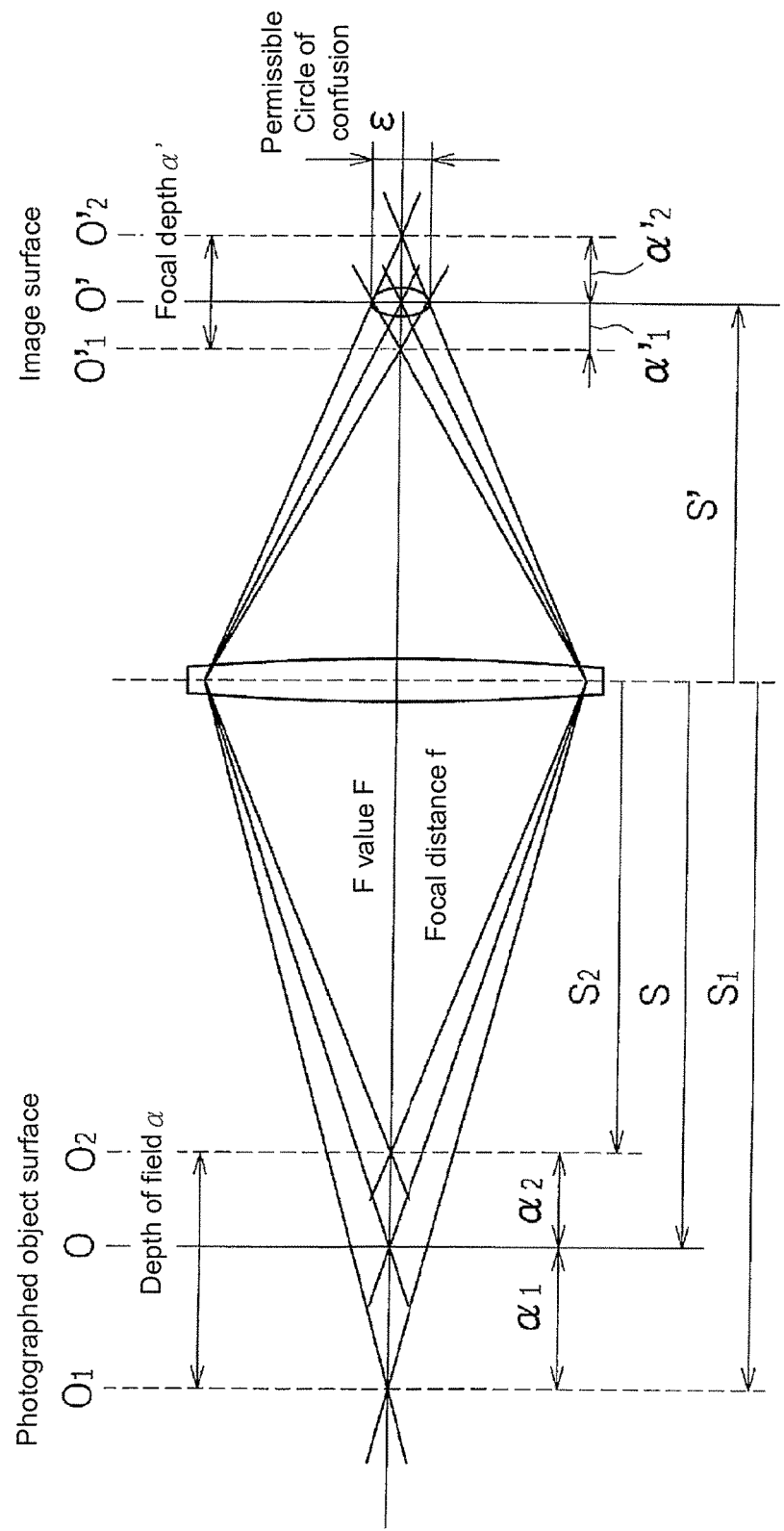
FIG. 21 is a brief illustrative diagram of a depth of field.

FIG. 20(a) is a sectional view of an optical system 110A that serves as a modified example of an optical system 110 of a photographing apparatus 100 of Embodiment 1 of the present invention. FIG. 20(b) is a sectional view of an optical system 210 of a photographing apparatus according to Embodiment 2 of the present invention. Further, the optical system 110A is different from the optical system 110 in terms of that the diaphragm 113 is disposed right behind instead of right in front of the second lens 112b.

As illustrated in Embodiment 1 or FIG. 20(a), when the distance a and the distance b satisfy a relationship a<b, and in particular, the distance a is not greatly different from the distance b, the distance c as specified below is also included, and a relationship: $0 \leq a \leq c$ is set to be satisfied. In addition, it is preferably that on the one hand the relationship is satisfied, and on the other hand, c is reduced as much as possible.

c: a distance from the light diffusion surface 115b of the diffusion plate 115 to the diaphragm 113

As illustrated in Embodiment 2 or FIG. 20(b), when the distance a and the distance b satisfy a relationship a<b, and in particular, the distance a is not greatly different from the distance b, the distance c is also included, and a relationship: $0 \leq c \leq b$ is set to be satisfied. In addition, it is preferably that on the one hand the relationship is satisfied, and on the other hand, c is reduced as much as possible.

Further, the present invention can be implemented in other various forms without departing from the main idea or main features. Therefore, the respective implementing manners or respective embodiments are merely illustrative in all aspects and cannot be explained in a limiting manner. The scope of the present invention is disclosed by the claims and is completely not restricted by the text of the description. In addition, variations or modifications in the equivalent scope of the claims all fall within the scope of the present invention.

What is claimed is:

1. A photographing apparatus, comprising:
   an optical system, comprising two or more than two lenses, a diaphragm disposed between any two adjacent lenses of the lenses, and an optical element disposed at a position that is behind a rearmost final lens of the lenses; and
   a photographing element, disposed at a position that is behind the optical element, wherein:
   the optical element comprises a light diffusion surface, the light diffusion surface is a circular ring structure of point symmetry and is a shape with discontinuous height gaps or a lens shape, and
   a first distance from a front surface of a forefront first lens to the diaphragm is greater than a second distance from the diaphragm to the photographing element.

2. The photographing apparatus according to claim 1, wherein:
   a third distance from the light diffusion surface to the diaphragm and the second distance satisfy a relationship: 0≤the third distance≤the second distance.

3. The photographing apparatus according to claim 1, comprising:
   an image restoration processing part, which performs image processing and restoration processing on image data acquired by the photographing element; and
   a restored image output part, which outputs an image restored by the image restoration processing part.

4. The photographing apparatus according to claim 3, wherein:
   the image restoration processing part comprises a Wiener filter or an Finite Impulse Response filter manufactured from a pattern of a point function that is diffused to be incident on the photographing element.

5. An optical system, comprising:
   two or more than two lenses;
   a diaphragm, disposed between any two adjacent lenses of the lenses; and
   an optical element, disposed at a position that is behind a real most final lens of the lenses, wherein:
   the optical element comprises a light diffusion surface, the light diffusion surface is a circular ring structure of point symmetry and is a shape with discontinuous height gaps or a lens shape, and
   a first distance from a front surface of a forefront first lens of the lenses to the diaphragm is greater than a second distance from a photographing element disposed at a position behind the optical element to the diaphragm.

* * * * *